United States Patent [19]

Beyer et al.

[11] Patent Number: 4,675,976
[45] Date of Patent: Jun. 30, 1987

[54] GRINDING MACHINE WITH FACILITIES FOR STORAGE OF SPARE WORK HOLDERS AND TOOLS

[75] Inventors: Rudolf Beyer, Esslingen; Lutz-Peter Heerdt, Altbach; Roland Schemel, Stuttgart, all of Fed. Rep. of Germany

[73] Assignee: Schaudt Maschinenbau GmbH, Stuttgart, Fed. Rep. of Germany

[21] Appl. No.: 785,889

[22] Filed: Oct. 9, 1985

[30] Foreign Application Priority Data

Oct. 11, 1984 [DE]  Fed. Rep. of Germany ....... 3437315

[51] Int. Cl.⁴ ............................................. B23Q 3/157
[52] U.S. Cl. ........................................ 29/568; 51/168; 51/216 R; 269/55
[58] Field of Search ...................... 29/568, 28; 51/216, 51/168; 279/1 TS; 409/240; 269/63, 55, 329

[56] References Cited

U.S. PATENT DOCUMENTS

| | | | |
|---|---|---|---|
| 2,074,844 | 3/1937 | Hill | 409/240 |
| 2,804,727 | 9/1957 | Schmidt | 51/168 X |
| 3,085,370 | 4/1963 | Dietz | 51/216 R |
| 3,825,245 | 7/1974 | Osburn et al. | 269/632 |
| 4,404,727 | 9/1983 | Zankl | 29/568 |
| 4,485,595 | 12/1984 | Minaniyama et al. | 51/168 X |
| 4,528,743 | 7/1985 | Bleich | 51/168 X |
| 4,551,953 | 12/1985 | Lewandowski | 29/568 X |
| 4,571,796 | 2/1986 | Sellner et al. | 29/568 X |

Primary Examiner—Gil Weidenfeld
Assistant Examiner—Glenn L. Webb
Attorney, Agent, or Firm—Peter K. Kontler

[57] ABSTRACT

A plain grinding machine wherein a grinding unit with a spindle for grinding wheels is reciprocable along the bed and is indexible about a vertical axis to transfer work holders between one or more indexible turrets or a magazine and a socket which is reciprocably mounted on the bed. The spindle of the grinding unit can further carry and rotate a clamping device for a workpiece to be treated by the internal grinding wheel of a holder which is separably secured to the socket. The clamping device can be stored in a second magazine which further serves for storage of one or more tool holders or tools. The grinding unit, the socket and each holder has clamping elements which can separably secure a holder to the socket, to the magazine or to the grinding unit. The control unit of the grinding machine transmits signals for actuation of the grinding unit when the latter is used as a manipulator to transfer holders between the socket and a turret or between the second magazine and the spindle.

31 Claims, 9 Drawing Figures

GRINDING MACHINE WITH FACILITIES FOR STORAGE OF SPARE WORK HOLDERS AND TOOLS

BACKGROUND OF THE INVENTION

The present invention relates to grinding machines, especially to plain grinding machines, and more particularly to improvements in grinding machines with magazines for storage of spare tools and the like.

A workpiece which is to be treated in a grinding machine must be securely clamped to its carriage during treatment by one or more grinding tools. It is already known to equip a grinding machine with a set of holders each of which can engage and properly support a different workpiece while the workpiece is treated by a grinding wheel. The configuration and/or other characteristics of the holders will depend on the characteristics of the workpieces, on the construction of the grinding machine and/or on the nature of contemplated treatment. For example, if workpieces are to be treated by a rotary grinding wheel which removes material from the external surfaces of workpieces, the work holders can be mounted on a pair of carriages and can be equipped with clamping tongs, with a clamping chuck, with a center point, with a floating entraining element, with a tailstock, or with one or more steady rests or the like.

If the grinding machine is to be converted from treatment of one type of workpieces to treatment of another type of workpieces, it is normally necessary to replace a previously used work holder with a different work holder. Such exchange of work holders is normally carried out by hand. This is a time-consuming operation, especially if the grinding machine is utilized for the treatment of small or medium sized lots of workpieces. In other words, the intervals of idleness of the machine during a change of setup are excessive.

OBJECTS AND SUMMARY OF THE INVENTION

An object of the invention is to provide a novel and improved grinding machine wherein a change of setup can be effected within a fraction of the time which is necessary in a manually convertible machine.

Another object of the invention is to provide a plain grinding machine with novel and improved means for storing and manipulating work holders and/or tool holders.

A further object of the invention is to provide a grinding machine whose versatility greatly exceeds that of heretofore known grinding machines.

An additional object of the invention is to provide a grinding machine whose operation is more economical than the operation of conventional grinding machines.

Still another object of the invention is to provide the above outlined grinding machine with novel and improved means for supporting workpieces during removal of material by one or more grinding tools.

A further object of the invention is to provide a grinding machine wherein the grinding unit can support workpieces and wherein such mounting of the workpieces renders it possible to treat in the machine workpieces having sizes and shapes such as cannot be handled in conventional grinding machines.

Another object of the invention is to provide a novel and improved magazine for work holders and/or tool holders which can be used in the above outlined grinding machine.

An additional object of the invention is to provide a novel and improved method of manipulating work holders and/or tool holders in a plain grinding machine.

Another object of the invention is to provide the grinding machine with novel and improved manipulator means for work holders and/or tool holders and to construct and assemble the manipulator means in such a way that it can perform additional important functions.

A further object of the invention is to provide novel and improved work holders and tool holders which can be utilized in the above outlined grinding machine.

One feature of the invention resides in the provision of a grinding machine, particularly a plain grinding machine. The machine comprises a bed, at least one rotary tool spindle which is movably mounted on the bed, a work holder carriage which is movably mounted on the bed to that the spindle and the carriage can move relative to each other in a plurality of mutually inclined directions (preferably at right angles to each other), at least one magazine, a plurality of holders in the magazine, and manipulator means for transferring selected holders between the magazine and the carriage. The carriage can comprise at least one socket for work holders and the magazine can be provided with a plurality of receiving means for work holders. The manipulator means of such machine preferably includes means for transferring work holders between selected receiving means of the magazine and the socket. The socket and each of the receiving means is provided with means for releasably coupling a selected work holder to the socket or to one of the receiving means. In accordance with a presently preferred embodiment of the invention, the grinding machine further comprises a grinding unit which rotatably supports the spindle, which is movably mounted on the bed, and which includes or constitutes the manipulator means. Such machine can further comprise a slide which is movably mounted on the bed. The grinding unit is preferably mounted on and is movable with the slide. Still further, the grinding machine preferably comprises means for indexing the grinding unit with reference to the slide. Such slide is reciprocable along the bed in a predetermined direction, and the grinding unit is preferably indexible about an axis (particularly a vertical axis) which is normal to such predetermined direction.

The carriage preferably further comprises a table, and the socket is detachably affixed to the table. Each of the work holders can comprise a different carrier for workpieces.

Each of the work holders can include a first coupling unit for attachment of such work holder to the socket, and a second coupling unit for attachment of the work holder to selected receiving means of the magazine. The socket is preferably provided with a facet, each of the receiving means is preferably provided with a facet, and each of the work holders has first and second facets. The arrangement is such that the first facet of a selected work holder abuts the facet of the socket when such selected work holder is coupled to the socket, and the second facet of a selected work holder abuts against the facet of selected receiving means when the work holder is stored in the magazine. The aforementioned coupling means are preferably provided in the regions of the facets of the socket and the receiving means, and the first and second coupling units are preferably adjacent to the first and second facets of the corresponding work holders.

The carriage can comprise a single socket which can be separably coupled to any one of the work holders.

The manipulator means includes means for moving the selected work holder in first and second directions substantially at right angles to each other for the purpose of coupling a selected holder to or of uncoupling such selected holder from the socket. The aforementioned table of the carriage is disposed in a predetermined plane (preferably in a horizontal plane), and the moving means is arranged to move selected work holders in a plane which is parallel to the predetermined plane.

The socket is preferably provided with a surface which is normal to its facet, and such socket preferably comprises a first clutch element which is installed in the region of its surface. At least one of the work holders is preferably provided with a second clutch element which is complementary to and engages the first clutch element in response to coupling of the one holder to the socket, i.e., in response to placing of the first facet of such work holder against the facet of the socket and in response to engagement of the first coupling unit with the coupling means of the socket. The clutch elements can transmit torque to a rotary component of the one work holder.

The control means of the machine is used to initiate and terminate the movements of the grinding unit, of the spindle and of the carriage. Such control means preferably further includes means for operating the manipulator means for the purpose of transferring work holders between the socket and the receiving means of the magazine. In other words, the control means of the grinding machine can be designed to automatically effect the transfer of holders between the socket of the carriage and selected receiving means of the magazine.

At least one of the holders can constitute or include a tailstock or a steady rest for workpieces; it can comprise a work spindle; it can include or carry a dressing tool, or it can comprise a tool spindle.

The means for releasably coupling a selected holder to the socket of the carriage can include at least one clamping element in the form of a plate or the like which is provided on the socket and is outwardly adjacent to the facet of the socket, means for moving the coupling element relative to the socket toward and away from the facet of the socket (such moving means can include a set of springs and a fluid-operated motor), and a shoe which is provided on the selected holder and is outwardly adjacent to the first facet of the selected holder. The manipulator means of such grinding machine comprises means for moving the shoe into and from engagement with the clamping element.

The magazine preferably comprises at least one turret and means for indexing the turret about a predetermined axis (preferably about a vertical axis) so as to locate selected receiving means in a predetermined position with reference to the manipulator means. The turret can comprise an annulus of receiving means which are disposed about its axis, and such turret can further comprise means for releasably coupling work holders to selected receiving means. The coupling means of the improved grinding machine can include first coupling means on the carriage, second coupling means on the turret for each of the receiving means, third coupling means provided on each holder and engageable with the first coupling means, and fourth coupling means provided on each of the holders and engageable with selected second coupling means. In other words, and as already mentioned above, each holder can carry two coupling means or coupling units one of which is designed to cooperate with the coupling means of the socket and the other of which is designed to cooperate with the coupling means in a receiving means of the magazine.

The coupling means can include or constitute means for mechanically coupling the holders to the carriage or to selected receiving means of the magazine. In addition to such coupling means, the grinding machine can further comprise means for connecting a holder on the carriage to a source of electrical energy and/or means for supplying a fluid medium (oil or air) to the holder which is attached to the carriage. The aforementioned clutch elements are used when the holder which is attached to the socket of the carriage has a mobile component (such as a rotary shaft) so that it is necessary to provide means which transmits motion from a prime mover to the rotary or mobile component of the holder which is coupled to the socket.

The grinding machine can further comprise an additional holder for the spindle of an internal grinding wheel. Such additional holder is then transferrable between the grinding unit and at least one receiving means of the magazine and is mounted on the grinding unit while it is in use to remove material from a workpiece on the grinding unit. Such grinding unit can include means for supplying electrical energy to the additional holder and/or with means for supplying a fluid to the additional holder while the additional holder is mounted on the grinding unit.

Another feature of the invention resides in the provision of a grinding machine, particularly a plain grinding machine, which comprises a bed, storing means, a grinding unit which is mounted on and is movable relative to the bed, a carriage which is mounted on the bed, a grinding tool holder which is transferrable between the storing means and the carriage, and a work holder or work clamping device which is transferrable between the magazine and the grinding unit. The grinding unit of such grinding machine can comprise a rotary spindle, and the machine preferably further comprises means for releasably coupling the work holder to the spindle. The work holder can comprise a disc with jaws or claws for releasably holding a workpiece, and such machine preferably further comprises means for releasably coupling the disc to the grinding unit in lieu of a grinding tool. The storing means of the just described grinding machine can comprise several magazines including a first magazine for temporary storage of tool holders and a second magazine for temporary storage of work holders and/or vice versa.

The novel features which are considered as characteristic of the invention are set forth in particular in the appended claims. The improved grinding machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
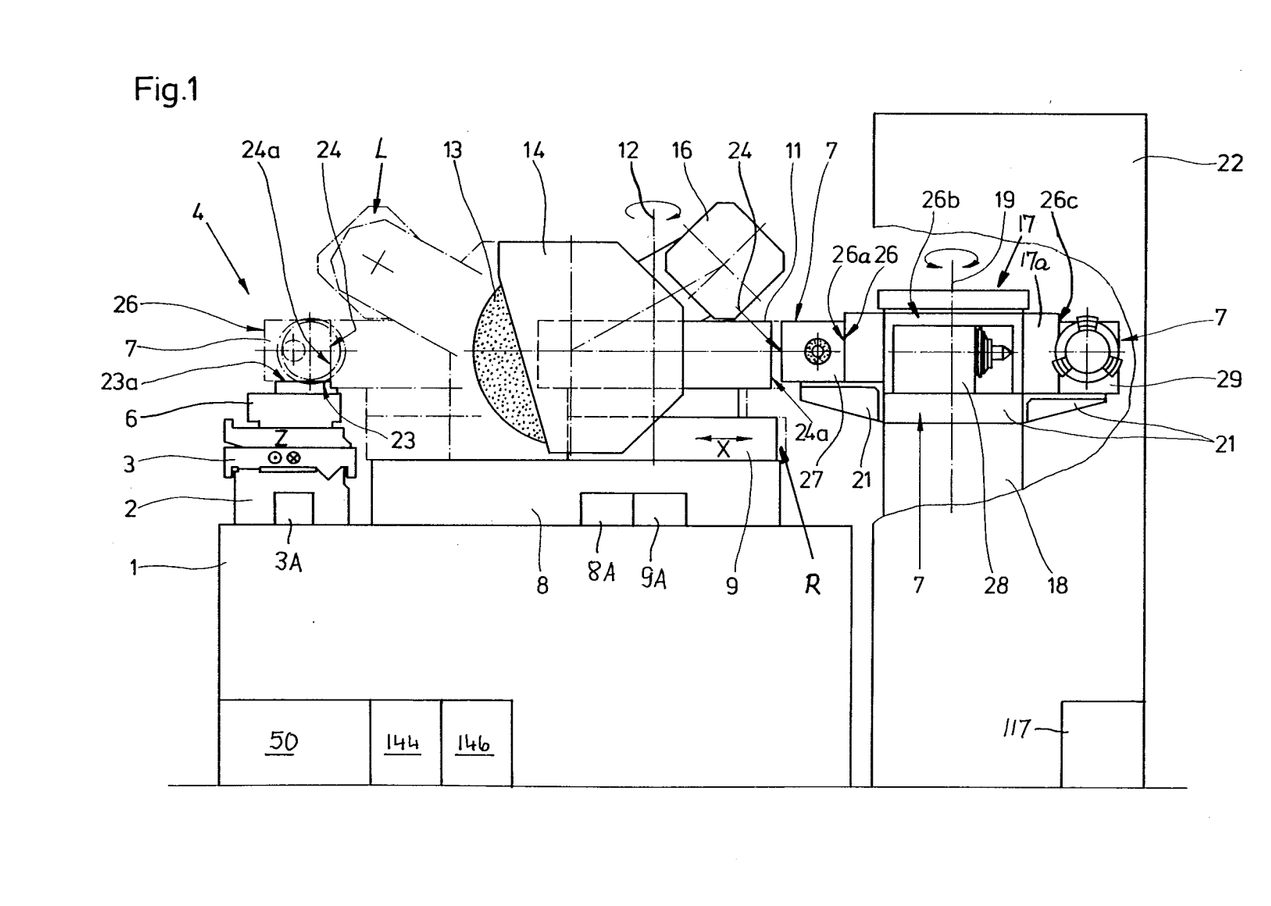
FIG. 1 is a schematic elevational view of a plain grinding machine which is equipped with a single magazine and embodies one form of the present invention.

FIG. 1 shows a plain grinding machine which comprises a bed 1, a support 2 which is mounted on the bed 1 and a table 3 which is reciprocable relative to the support 2 at right angles to the plane of FIG. 1 (namely in the Z-direction). The table 3 supports a socket 6 which is separably secured thereto in a manner not forming part of the present invention and shares its movements in the Z-direction. The table 3 and the socket 6 together constitute a carriage for workpieces which are to be treated by a grinding wheel 13 or an analogous material removing tool. FIG. 1 further shows that the socket 6 is separably coupled to a work holder 7 which, together with the socket 6, constitutes a work holding unit 4.

The bed 1 further carries a second support 8 for a slide 9 which is reciprocable in directions indicated by the double-headed arrow X, namely at right angles to the direction of reciprocatory movement of the table 3 relative to the bed 1 and support 2. The slide 9 carries a grinding unit 11 including a rotary spindle 10 (see FIG. 2A). The grinding wheel 13 is designed for external grinding of workpieces which are installed in the work holding unit 4 including the socket 6 and a selected holder 7. The major part of the grinding wheel 13 on the spindle 10 is surrounded by a protective hood 14. The reference character 16 denotes a prime mover (for example, a variable-speed electric motor) which is mounted on the casing of the grinding unit 11 and serves to transmit torque to the spindle 10.

The bed 1 is adjacent to a column 18 for a magazine 17 having a plurality of receiving means or pockets 21 for temporary storage of holders 7. The column 18 contains or supports a motor 117 which is utilized to index the magazine 17 about a vertical axis 19. The receiving means 21 are preferably uniformly distributed about the axis 19 and each thereof can be moved to a predetermined position in which it faces the grinding unit 11 on the slide 9. The major parts of the magazine 17 and of the column 18 are confined in a casing 22. The motor 117 can be replaced by a transmission (e.g., a geneva movement).

The upper side of the socket 6 on the table 3 constitutes a facet or surface 23a, and the underside of the holder 7 on the socket 6 constitutes a facet or surface 23 which abuts against the facet 23a when the socket 6 and the holder 7 are assembled into a work holding unit 4. The socket 6 has coupling means for separably securing the holder 7 thereto in such orientation that the facet 23 abuts against the facet 23a. Complementary coupling means (first coupling unit) are provided on the holder 7 in the region of its facet 23. The holder 7 is further provided with a second surface or facet 24 which extends at right angles to the facet 23 and can be caused to abut against a surface or facet 24a on the grinding unit 11 when the grinding unit is used as a manipulator which transfers holders 7 between the socket 6 and a selected receiving means 21 of the magazine 17 on the column 18. The grinding unit 11 comprises a coupling means which is disposed in the region of its surface or facet 24a and can releasably clamp a holder 7 to the grinding unit (i.e., to the manipulator) while such holder is being transferred from the socket 6 toward a selected receiving means 21 or vice versa.

Each holder 7 further comprises a third surface or facet 26 which is parallel to the facet 24 and is normal to the facet 23. The facet 26 can be contacted by the surface or facet 26a, 26b or 26c of a selected receiving means 21 in the magazine 17, namely to the facet of that receiving means which faces the grinding unit 11. Each receiving means 21 further comprises coupling means for releasably clamping a holder 7 in such position that the facet 26 of the holder 7 lies flush against the respective facet 26a, 26b or 26c. The holder 7 comprises coupling means (second coupling unit) which cooperates with the coupling means of the selected receiving means 21 to ensure that the holder 7 is reliably held during storage in the magazine 17.

The grinding machine comprises a conventional control unit 50 which can be installed in or adjacent to the bed 1 and the exact construction of which forms no part of the present invention. Such control unit includes means for starting or arresting the prime mover 16, for starting or arresting the drive 9A which can move the slide 9 along the support 8, for starting or arresting the drive 3A which can move the table 3 along the support 2, and to perform additional functions when the grinding machine is in use. In addition, the control unit 50 includes means for operating the grinding unit (manipulator) 11 and for indexing the magazine 17 about the axis 19 as well as for engaging and disengaging the aforementioned coupling means in order to ensure that the transfer of holders 7 between the socket 6 and selected receiving means 21 of the magazine 17 can be effected automatically without any assistance on the part of and/or supervision by the attendants.

The slide 9 supports a motor 8A which serves to index the grinding unit 11 about a vertical axis 12 between the positions L and R which are shown in FIG. 1. The signals for starting or arresting the drive 8A are furnished by the control unit 50.

If the holder 7 on the socket 6 in the left-hand portion of FIG. 1 is to be replaced with a different holder, the control unit 50 transmits a signal which causes the drive 8A to index the grinding unit 11 through 180° so that the grinding unit assumes the position L and the facet 24a is closely adjacent to the facet 24 of the holder 7 which is located on the socket 6. In the next step, the control unit 50 transmits a signal to the drive 9A which shifts the slide 9 and the grinding unit 11 thereon in a direction to the left, as viewed in FIG. 1, so that the facet 24a comes into actual abutment with the facet 24 of the holder 7 on the socket 6. A further signal from the control unit 50 entails a disengagement of the coupling means between the socket 6 and the holder 7 as well as an engagement of the coupling means between the holder 7 and the grinding unit 11. In other words, the control unit 50 initiates automatic attachment of the holder 7 to the grinding unit 11 while substantially simultaneously terminating the connection between the holder 7 and the socket 6. The exact construction of the coupling means between the socket 6 and a holder 7, as well as between a holder 7 and the grinding unit 11, will be described hereinafter.

The control unit 50 thereupon transmits one or more signals which initiate movements of the slide 9 and table 3 relative to each other (the table 3 can move in the Z-direction and the slide 9 is movable in the X-direction) so that the holder 7 on the grinding unit 11 is free to be indexed about the axis 12 while the unit 11 moves from the position L to the position R. Thus, the grinding unit 11 is indexed through 180° whereby the holder 7 is moved next to an empty receiving means 21 of the magazine 17. Indexing of the grinding unit 11 about the axis 12 is followed by a movement of the slide 9 in a direction to the right, as viewed in FIG. 1, so that the facet 26 of the holder 7 is moved against the facet 26a, 26b or 26c of the empty receiving means 21 in the magazine 17. The receiving means 21 in the left-hand portion of the magazine 17 was empty, and FIG. 1 shows that the grinding unit 11 has already deposited the holder 7 (shown by solid lines) in this receiving means 21 in an orientation such that the facet 26 abuts against the facet 26a. The control unit 50 thereupon initiates a disengagement of the grinding unit 11 from the holder 7 and the attachment of holder 7 to the corresponding receiving means 21. The drive 9A is thereupon started to shift the slide 9 in a direction to the left, as viewed in FIG. 1, so as to allow for unimpeded indexing of the magazine 17 about the axis 19 under the action of the motor 117. The motor 117 receives appropriate signals from the control unit 50. The purpose of indexing the magazine 17 is to place another holder 7 adjacent to the grinding unit 11 so that the grinding unit can accept such holder for transfer toward and into abutment with the socket 6 on the table 3.

The sequence of operations which must be carried out in response to signals from the control unit 50 in order to detach a fresh holder 7 from the respective receiving means 21, to couple such holder to the grinding unit 11, to index the grinding unit to the position L, to detach the holder 7 from the unit 11, and to couple the holder to the socket 6 is analogous but inverse to the aforedescribed sequence of operations involving the transfer of a holder 7 from the socket 6 into an empty receiving means 21 of the magazine 17.

The magazine 17 can be designed to accommodate, within reasonable limits, any desired number of holders 7. For example, one of the holders 7 can constitute or include a carrier 27 for an internal grinding wheel, another holder 7 can include or constitute a carrier 28 for the spindle of a tailstock, a further holder 7 can include or constitute a work carrier 29 with any one of numerous well known motion transmitting and/or clamping means, such as a chuck, tongs, center point, floating entraining element, steady rest and/or others.

Figure 2A:
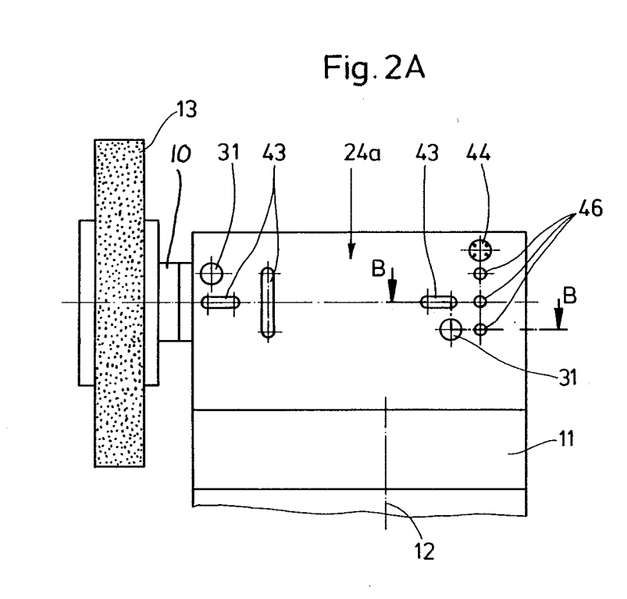
FIG. 2A is an enlarged front elevational view of the grinding unit in the machine of FIG. 1.
Figure 2B:
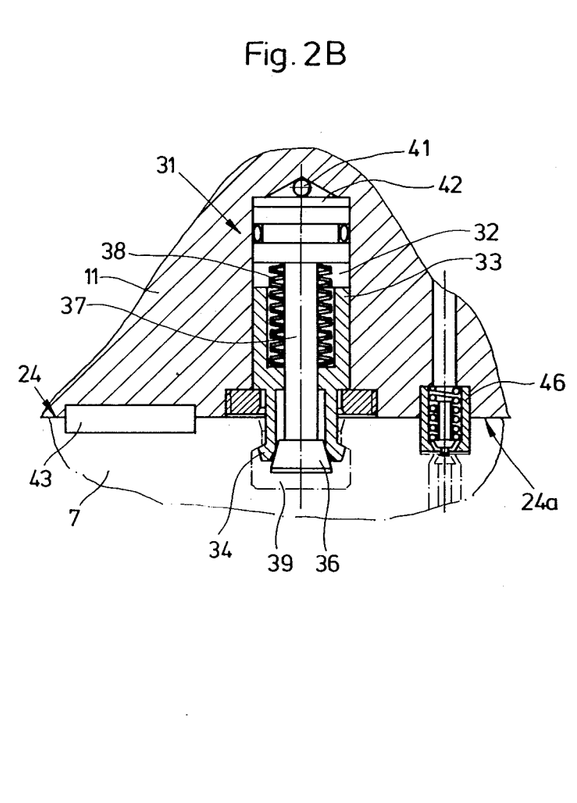
FIG. 2B is an enlarged fragmentary sectional view as seen in the direction of arrows from the line B—B in FIG. 2A.

That coupling unit of the holder 7 which is installed in the region of the facet 24 and that coupling means of the grinding unit 11 which is disposed in the region of the facet 24a are illustrated in FIGS. 2A and 2B. The grinding unit 11 is indexible about the vertical axis 12 which is indicated in FIG. 2A by a phantom line. As mentioned above, the facets 24 and 24a are in abutment with or are immediately or closely adjacent to each other when the holder 7 is properly coupled to the grinding unit 11.

Each coupling means 31 of the grinding unit 11 comprises a male clamping member 33 which is reciprocable in a bore or hole 32 of the unit 11 and extends forwardly beyond the facet 24a. The exposed end portion of the clamping member 33 is formed with an annulus of claws 34 which can be moved apart by the conical head 36 of a reciprocable expander 37 constituting a piston which is sealingly guided along the surface surrounding the bore 32. The claws 34 form an annulus around the conical head 36 of the piston 37 and the latter is biased upwardly, as viewed in FIG. 2B, by a set of dished springs 38 which surround its shank and cause the claws 34 to move apart under the action of the head 36. The upper end face of the piston 37, as viewed in FIG. 2B is adjacent to a cylinder chamber 42 which can receive pressurized hydraulic fluid (e.g., oil) by way of a channel 41 which is machined into the casing of the grinding unit 11 whereby the fluid causes the piston 37 to move downwardly, as viewed in FIG. 2B, so that the head 36 permits the claws 34 to move toward the axis of the piston 37 and to be extractible from a suitably configurated recess 39 in the facet 24 of the holder 7. The force with which the claws 34 engage the adjacent surface in the recess 39 suffices to ensure the establishment of a reliable clamping connection between the holder 7 and the grinding unit 11 during transport of the holder between the socket 6 and selected receiving means 21 of the magazine 17. Signals for admission of pressurized fluid into the cylinder chamber 42 are transmitted by the control unit 50.

The coupling means between the grinding unit 11 and the holder 7 can further comprise suitable orienting means to ensure that the holder 7 is held in a predetermined orientation which is best suited for immediate, accurate and predictable introduction into selected empty receiving means 21 of the magazine 17. The orienting means can comprise one or more tongues 43 which can extend in the same direction or in different directions (see FIG. 2A) and are received in suitable grooves in the facet 24 or 24a when such facets abut each other. FIG. 2A shows two orienting tongues 43 which extend at right angles to the axis 12 and a single orienting tongue 43 which extends in parallelism with such axis.

In the embodiment of FIGS. 2A and 2B, the coupling unit of the holder 7 includes those parts which define the recesses 39 in the facet 24. Each coupling means 31 of the grinding unit 11 cooperates with the surface surrounding the corresponding recess 39 to reliably hold the holder 7 during transfer between the socket 6 and selected receiving means 21 of the magazine 17. Such coupling means are sufficient when the holder 7 need not be held by the grinding unit 11 while it carries a workpiece which is to be treated by an internal grinding wheel. This mode of operation will be described in greater detail with reference to FIGS. 6 and 7.

FIGS. 2A and 2B further show means for connecting the holder 7 to a suitable source of electrical energy while the holder is carried by the grinding unit 11. For this purpose, the grinding unit 11 is provided with one or more electric conductors 44 which are connected to a source of electrical energy (see the source 144 in FIG. 1) and which can carry current to one or more current-consuming parts on the holder 7. The holder 7 on the grinding unit 11 may further require a hydraulic or pneumatic fluid. Such fluid can be conveyed from a source 146 by way of one or more hydraulic or pneumatic conduits 46 three of which are shown in FIG. 2A and one of which is shown on a larger scale in the right-hand portion of FIG. 2B. The means for supplying a fluid medium to a holder 7 on the grinding unit 11 can be of the type known as E-006 manufactured by Carl Kurt Walther GmbH & Co. KG, Wuppertal-Vohwinkel, German Federal Republic. The conduit or conduits 46 can supply to an internal grinding wheel a hydraulic fluid, an oil mist, a cooling medium and/or others.

The means for establishing electrical connections between holders 7 and the grinding unit 11 can constitute commercially available polypole cable couplings (also called manifolds or multiple plugs) of the type ET 001 distributed by Carl Kurt Walther GmbH & Co. The conductors 44 can transmit signals and they can also supply electrical energy to the current-consuming component or components of the holder 7 on the grinding unit 11.

Figure 3:
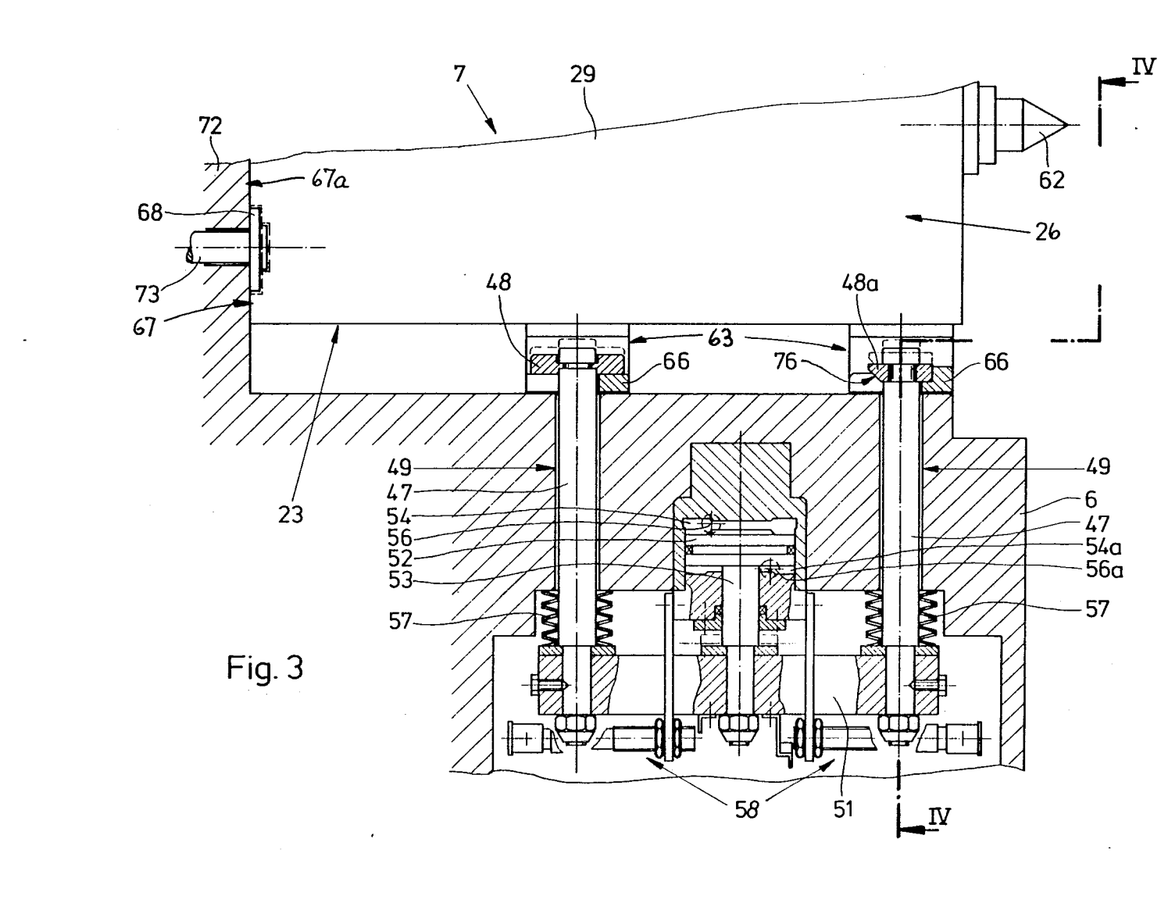
FIG. 3 is a fragmentary sectional view of a socket forming part of a carriage for workpieces and of a work holder which is coupled to the socket and is provided with a rotary center point for workpieces.
Figure 4:
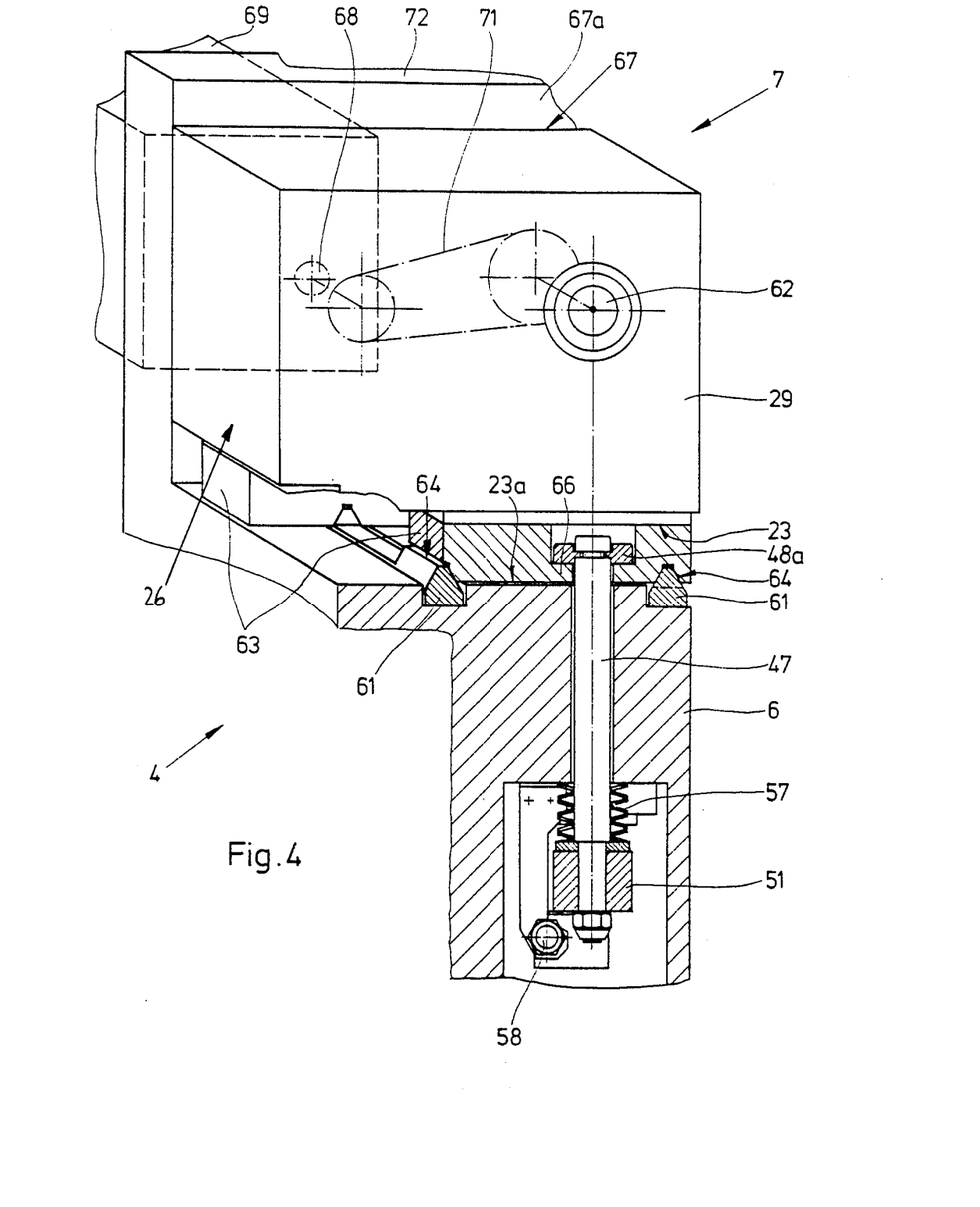
FIG. 4 is a partly sectional perspective view of the socket and work holder, substantially as seen in the direction of arrows from the line IV—IV in FIG. 3.

FIGS. 3, 4, 5A and 5B show one presently preferred form of a separable connection between the socket 6 and a holder 7. Such connection includes coupling means provided in the socket 6 adjacent to its facet 23a and a coupling unit adjacent to the facet 23 of the holder 7. As mentioned above, the work holding unit including the socket 6 and the holder 7 can be used to support a wide variety of workpieces which may but need not be driven while being treated by one or more material removing grinding tools. The holder 7 which is shown in FIGS. 3 and 4 comprises a driven center point 62, i.e., the holder 7 of FIGS. 3 and 4 includes the carrier 29 which is shown in FIG. 1.

The manner in which the socket 6 is attached (for example by hand) to the table 3 of the carriage including the parts 3 and 6 is not specifically shown in the drawing. The socket 6 can be more or less permanently secured to the table 3 because it is designed to accept any one of a variety of holders 7, depending on the nature of the grinding operation and the type of workpieces which are to be treated by the grinding wheel 13 or by another grinding tool.

The clamping means of the socket 6 comprises two plate-like clamping elements 48 and 48a secured to bolts 47 which are reciprocable in bores or holes 49 of the socket 6. The clamping elements 48, 48a are outwardly adjacent to the facet 23a of the socket 6, and those end portions of the bolts 47 which are located in the interior of the socket 6 are coupled to each other by a link 51 so that the clamping elements 48 and 48a are reciprocated as a unit. The means for reciprocating the clamping elements 48, 48a relative to the socket 6 comprises a piston 52 which is reciprocably mounted in a cylinder of the socket 6 and has a piston rod 53 connected to the link 51. The cylinder for the piston 52 is a double-acting cylinder and has two cylinder chambers 54 and 54a at the opposite axial ends of the piston 52. The socket 6 has channels 56, 56a for admission of pressurized hydraulic fluid into and for evacuation of such fluid from the corresponding cylinder chambers 54 and 54a. The link 51 is adjacent to several sensors 58 in the form of proximity detectors which monitor the position of the link and hence the positions of the clamping elements 48, 48a relative to the facet 23a of the socket 6. It is clear that the proximity detectors 58 constitute but one type of sensors which can be utilized to monitor the positions of the link 51 and clamping elements 48, 48a.

Figure 5A:
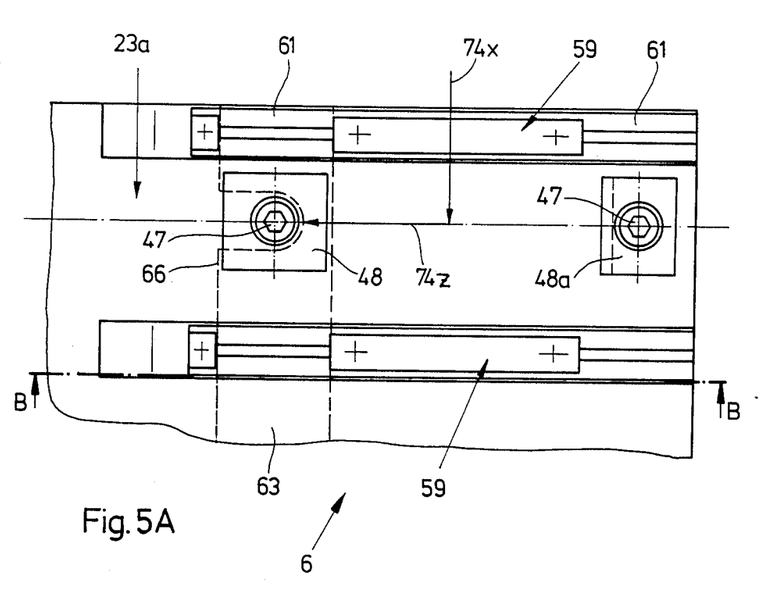
FIG. 5A is a plan view of the socket which is shown in FIGS. 3 and 4.
Figure 5B:
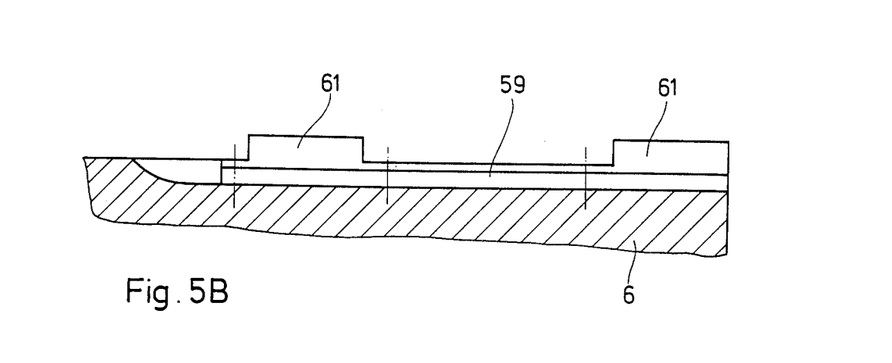
FIG. 5B is a sectional view as seen in the direction of arrows from the line B—B in FIG. 5A.

FIG. 5A shows the positions of the clamping elements 48 and 48a with reference to the facet 23a of the socket 6. In addition to the clamping elements 48, 48a, the clamping means of the socket 6 further comprises two elongated centering members 59 which flank the clamping elements 48, 48a and cooperate with complementary centering elements of the holder 7 which is to be or which is already coupled to the socket 6. As can be seen in FIG. 5B, each of the centering members 59 comprises two roof-shaped protuberances 61 which can cooperate with strip-shaped portions 63 of the holder 7 when the facet 23 of the holder abuts against the facet 23a of the socket 6. The centering members 59 are parallel to the line connecting the axes of the bolts 47 for the clamping elements 48 and 48a.

Packages of dished springs 57 are provided on the bolts 47 to urge the link 51 downwardly, as viewed in FIG. 3 or 4, i.e., to move the coupling elements 48, 48a toward the facet 23a of the socket 6.

Referring now in detail to FIG. 4, the holder 7 which is shown therein has two strip-shaped portions 63 which extend from its facet 23 and cooperate with the centering members 59 of the socket 6 to ensure adequate orientation of the holder 7 when the latter is coupled to the socket to support a rotary workpiece. Each of the strip-shaped portions 63 has two wedge-shaped recesses 64 for the protuberances 61 of the centering members 59. Furthermore, each of the strip-shaped portions 63 includes a central part which constitutes a slotted shoe 66 (see particularly FIG. 5A) serving to engage the corresponding clamping element 48 or 48a so as to hold the facet 23 against movement away from the facet 23a. The manner in which the shoe 66 of one of the strip-shaped portions 63 of the holder 7 engages the clamping element 48 of the socket 6 is shown in FIG. 5A wherein the portion 63 is indicated by broken lines.

Since the center point 62 of the holder 7 (work spindle carrier 29) of FIG. 4 must receive torque when the grinding machine is in use and a workpiece is held by the point 62 so that it rotates about its axis while being engaged by the working surface of the grinding wheel 13 or by the working surface of another grinding tool, the machine comprises a prime mover 69 which is mounted on a stationary extension 72 of the socket 6 and drives one element of a clutch 68 serving to transmit torque to a complementary second clutch element on the holder 7. The second clutch element transmits torque to the center point 62 by way of a toothed belt transmission 71. The rear surface or facet 67 of the holder 7 (such rear surface is parallel to the surface beyond which the center point 62 extends) is adjacent to and abuts against a surface or facet 67a of the socket 6, and more particularly of the extension 72 which carries the prime mover 69.

The holder 7 and the extension 72 of the socket 6 may but need not be provided with means for positively coupling the extension 72 to the holder 7. Such positive coupling is not always necessary, i.e., the coupling including the clamping elements 48, 48a and shoes 66 normally suffices to ensure adequate retention of the holder 7 on the socket 6. The clutch 68 can be replaced with other types of torque-transmitting means, and the prime mover 69 can constitute a motor or a transmission. The toothed belt transmission 71 can be replaced with a chain drive or with any other suitable means for transmitting torque from the second element of the clutch 68 to the center point 62. If the holder 7 is to be positively coupled to the extension 72 of the socket 6, the coupling means may be similar to the coupling means which is shown in FIGS. 2A and 2B. Furthermore, the extension 72 can be equipped with a conductor corresponding to the conductor 44 of FIG. 2A and with one or more conduits corresponding to the conduits 46 of FIGS. 2A and 2B if the holder 7 carries one or more current consuming parts or is to be supplied with a hydraulic or pneumatic fluid when it is coupled to the socket 6.

FIG. 3 shows a shaft 73 which receives torque from the prime mover 69 and which can constitute, or transmit torque, to the first element of the clutch 68. The means for transmitting torque from the second element of the clutch 68 to the center point 62 of the holder 7 in FIG. 3 by way of the (non-illustrated) toothed belt transmission 71 is not specifically shown in FIG. 3.

The manner in which a holder 7 can be coupled to the socket 6 is as follows:

The holder which is to be coupled to the socket 6 is delivered by the grinding unit 11 in the aforedescribed manner, namely the unit 11 withdraws the holder 7 from the corresponding receiving means 21 of the magazine 17 and is thereupon indexed through 180° about the axis 12 so as to move the selected holder close to the socket 6. In the next step, the grinding unit 11 moves the holder 7 in the direction of the arrow 74X (see FIG. 5A), i.e., in the X-direction. The position of the grinding unit 11 with reference to the table 3 of the carriage for workpieces is selected in such a way that, while the holder 7 moves in the direction of the arrow 74X, the strip-shaped portions 63 which extend beyond the facet 23 of the holder 7 are free to advance between the protuberances 61 of the centering members 59 on the socket 6. When the shoes 66 of the portions 63 are moved into register with the respective bolts 47, the direction of movement of the holder 7 is changed from that which is indicated by the arrow 74X to that which is indicated by the arrow 74Z so that the slots of the shoes 66 receive the outermost portions of the adjacent bolts 47 and the shoes are in proper engagement with respective clamping elements 48 and 48a. The movements in the direction of the arrows 74X and 74Z take place in a plane which is parallel to the plane of the table 3. While moving in the direction which is indicated by the arrow 74Z, the holder 7 is moved in parallelism with the centering members 59. At the time the shoes 66 are being moved in the direction of arrow 74Z, the clamping elements 48 and 48a are held in the raised positions (indicated in FIG. 3 by phantom lines) so that the shoes 66 can slide along or close to the facet 23a of the socket 6 during movement to their clamping or operative positions. The elements of the clutch 68 preferably engage each other in automatic response to movement of the holder 7 in the direction of the arrow 74Z so that the center point 62 is ready to receive torque from the prime mover 69 as soon as the attachment of the holder 7 to the socket 6 is completed. The arrangement is preferably such that the strip-shaped portions 63 are closely adjacent to or slightly touch the facet 23a of the socket 6 while the holder 7 is moved in the directions which are indicated by the arrows 74X and 74Z.

The channel 56 admits pressurized hydraulic fluid into the corresponding cylinder chamber 54 for the piston 52 as soon as the movement of the holder 7 in the direction of the arrow 74Z is completed. This cuases the piston rod 53 to move the clamping elements 48 and 48a from the phantom-line to the solid-line positions of FIG. 3 so that the clamping elements properly engage the corresponding shoes 66 and the attachment of the holder 7 to the socket 6 is completed. The centering members 59 and their protuberances 61 cooperate with the strip-shaped portions 63 of the holder 7 to ensure adequate centering of the holder 7 not later than when the coupling operation is completed. At least one of the clamping elements 48, 48a is provided with a cam face 76 (see the cam face 76 of the clamping element 48a in FIG. 3) which cooperates with a complementary cam face on the shoe 66 of the corresponding strip-shaped portion 63 on the holder 7 to ensure additional orientation of the holder during attachment to the socket 6. The cam face 76 and the corresponding cam face on the shoe 66 of the right-hand strip-shaped portion 63 of FIG. 3 cooperate to move the holder 7 in the axial direction of the center point 62.

An important advantage of the improved grinding machine is that a change of setup takes up little time since the grinding unit 11 constitutes the manipulator which can transfer holders 7 between the magazine 17 and the socket 6. The savings in time are even more pronounced because the control unit 50 serves to automatically actuate the grinding unit 11 in order to remove a holder 7 from the magazine 17, to attach such holder to the unit 11, to index the unit 11, to attach the holder to the socket 6 and to simultaneously or shortly before detach the holder from the unit 11. A pronounced shortening of the intervals of time which are required to change the setup is particularly important when the grinding machine is to treat short or medium long series of workpieces. It has been found that the output of the improved grinding machine is incomparably higher than that of a conventional machine wherein the changes of setup necessitate extensive manual work and/or wherein the controls are not designed to transmit signals which are needed to assemble a fresh work holding unit and/or to dismantle and store certain parts of a previously utilized work holding unit.

The feature that the grinding unit 11 constitutes a manipulator further contributes to compactness of the improved grinding machine because the parts which are used to move tools relative to the workpieces and/or relative to a tool magazine can be used as a means for transferring holders 7 between the magazine 17 and the socket 6. In addition, the provision of a grinding unit which constitutes a manipulator contributes to lower initial and maintenance cost of the grinding machine in comparison with machine tools wherein the unit which carries the tool spindle does not perform any other functions so that, if such machine tools are to be designed for automatic transfer of work holders or the like, they must be provided with a manipulator which performs only one function, namely that of transporting work holders to and from the locale of actual use.

The feature that the grinding unit 11 is mounted on a compound slide including the support 8 (which is or can be movable relative to the bed 1) and the slide 9 renders it possible to operate the grinding unit 11 not unlike a robot.

The provision of a socket 6 which can be coupled with any one of a large or small number of holders 7 contributes to compactness and lower cost of the improved grinding machine. Thus, the clamping means (including the clamping elements 48, 48a) of the socket 6 can be used to couple such socket with any one of several holders 7, and the complementary clamping unit (note the strip-shaped portions 63) need not have any moving parts so that the provision of such clamping unit on each of the holders 7 contributes little to the overall cost of a holder. The same applies for the clamping means of the magazine 17, i.e., each such clamping means can be designed in the same way as the clamping means of the socket 6 to cooperate with a clamping unit 5 which is identical with the clamping unit including the strip-shaped portions 63 shown in FIG. 4. The aforediscussed clamping means of the socket 6 and magazine 17 as well as the clamping units of the holders 7 ensure predictable and reproducible attachment of holders to the socket 6 or to receiving means 21 which saves time for a change of setup because the grinding unit 11 invariably finds its way to an optimum position for reception of a holder from the socket 6 or from one of the receiving means 21, or for delivery of a holder to the socket 6 or to the selected receiving means 21.

The provision of facets on the socket 6, in the receiving means 21, on the grinding unit 11 and on the holders 7 contributes still further to predictable and reliable orientation of holders in optimum positions on the socket 6, in the magazine 11 and/or on the grinding unit.

The feature that the grinding unit 11 can move a holder 7 in the directions of arrows 74X and 74Z (i.e., in the X- and Z-directions) contributes to simplicity of the grinding machine and particularly to simplicity of the drive means for various movable parts because the unit 11 is movable in the directions of arrows X and Z anyway so that, when necessary, the existing drive means are used with advantage to effect a transfer of holders from the magazine to the socket or vice versa. The additional feature that the movements of a holder 7 for the purpose of attaching it to or for detaching it from the socket 6 take place in a single plane (which is preferably parallel to the plane of the table 3) contributes still further to simplicity and compactness of the improved grinding machine.

The utilization of a clutch (such as the clutch 68) which can be engaged or whose elements can be separated from each other in response to movement of the corresponding holder 7 in a single direction (e.g., in the Z-direction) contributes still further to simplicity of the grinding machine because the parts (such as the center point 62) which must receive torque when the corresponding holders are in use are automatically coupled to or detached from the prime mover (69) in response to proper attachment of the corresponding holder 7 to or its detachment from the socket 6. Thus, the attachment of the holder 7 of FIGS. 3–4 to the socket 6 by the mechanical means including the clamping elements 48, 48a can take place simultaneously with engagement of the clutch element 73 with the second element of the clutch 68, and the clutch 68 is disengaged simultaneously with termination of the mechanical connection between the holder 7 of FIGS. 3–4 and the socket 6. The coupling means including the elements 48 and 48a has been found to be especially simple, practical, compact and reliable.

The magazine 17 can be provided with receiving means which are disposed one above the other or are distributed in another suitable way. The utilization of a magazine wherein the receiving means 21 are equidistant from one another and are disposed around the axis 19 about which the magazine 17 must be indexed in order to move selected receiving means 21 to a predetermined position relative to the manipulator including the grinding unit 11 has been found to be particularly advantageous because it reduces the space requirements of the magazine and shortens the intervals which elapse during movement of selected receiving means 21 to the aforementioned predetermined position. Moreover, the magazine 17 can be provided with a substantial number of receiving means which occupy little room and each of which is readily accessible to the operators as well as to the grinding unit 11. The provision of discrete coupling means for each of the receiving means 21 contributes to a further shortening of the time interval which are required to transfer a holder 7 into or to remove a holder 7 from selected receiving means.

The provision of one or more conductors 44 and/or one or more conduits 46 in the socket 6, in the holders 7 and/or in the grinding unit 11 enhances the versatility of the grinding machine because this renders it possible to utilize sophisticated holders which can receive electrical energy or which can be connected with sources of hydraulic or gaseous fluids while attached to the socket 6 or to the grinding unit 11. Mounting of the prime mover 69 on the socket 6, on the table 3 or on the bed 1 contributes to simplicity of the grinding machine because the prime mover need not be moved relative to the bed and can be connected with an energy source in a simple and inexpensive way. Such utilization of a stationary prime mover is possible because the holder 7 which has one or more driven parts is provided with the second element of the aforediscussed clutch 68 or an analogous or equivalent clutch.

Figure 6:
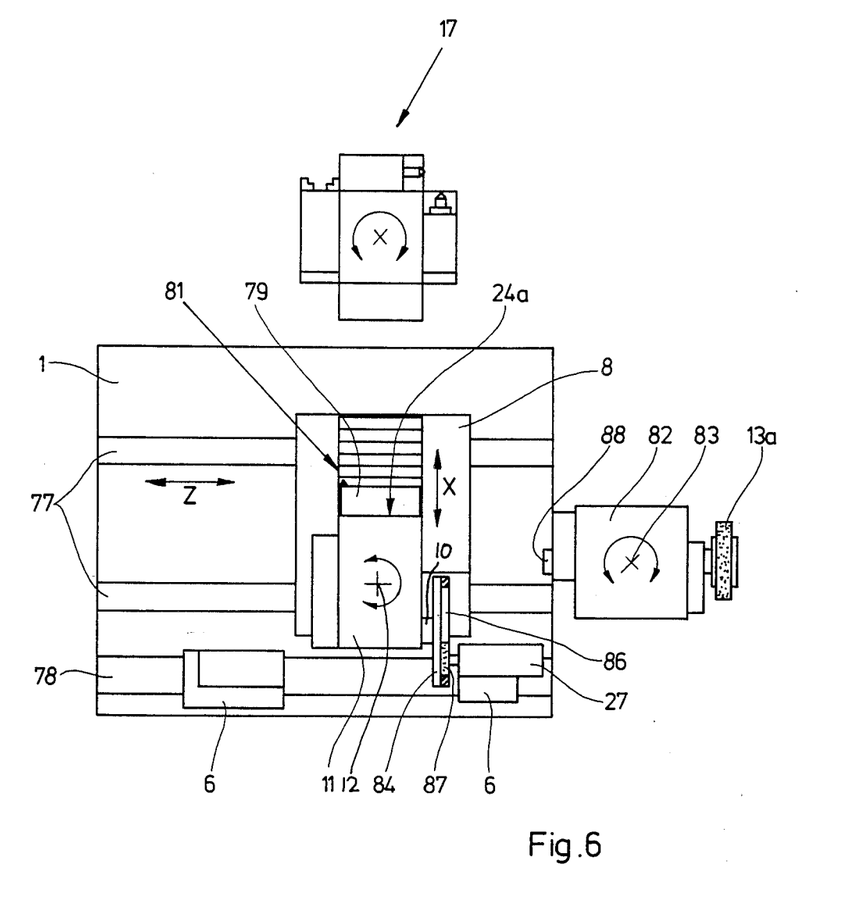
FIG. 6 is a schematic plan view of a modified grinding machine with two magazines.

FIG. 6 shows a modified plain grinding machine which comprises a bed 1, a grinding unit 11 which is indexible about a vertical axis 12, and a magazine 17. The construction of the magazine 17 can be identical with that of the magazine which is shown in FIG. 1. The bed 1 is provided with horizontal guide rails 77 which extend in the Z-direction and reciprocably carry the support 8 for the grinding unit 11. The grinding unit 11 is reciprocable relative to its support 8 in the X-direction, i.e., at right angles to the longitudinal direction of the guide rails 77. The slide which is interposed between the support 8 and the grinding unit 11 is not specifically shown in FIG. 6.

The bed 1 further supports elongated ways 78 extending in parallelism with the guide rails 77 and supporting several sockets 6 each of which is separably clamped to the ways 78. FIG. 6 merely shows two sockets 6 including a right-hand socket which carries a holder 7 with a carrier 27 for an internal grinding wheel 87, and a left-hand socket 6 which is unoccupied.

The grinding unit 11 carries a dressing apparatus 79 which is separably coupled thereto in a manner as described, for example, in connection with FIGS. 2A and 2B. Thus, the housing of the dressing apparatus 79 abuts against the surface or facet 24a of the grinding unit 11. The dressing apparatus 79 constitutes a holder for a dressing tool in the form of a fixedly mounted diamond 81 which can be used to treat the working surface on a grinding wheel on the spindle 10 of the grinding unit 11. The apparatus 79 can be stored in receiving means of the magazine 17 and/or 82.

The grinding machine of FIG. 6 further comprises a second or auxiliary magazine 82 which is indexible about a vertical axis 83 and as several receiving means 88 capable of accommodating or supporting grinding wheels 13a as well as a work clamping device 84 and analogous or similar work clamping devices. The exact construction of the clamping device 84 will be described with reference to FIG. 7. FIG. 6 shows that the grinding wheel 13a is supported by one of the receiving means 88 and that the spindle 10 of the unit 11 supports the work clamping device 84 for a workpiece 86 in the form of a ring having external teeth and a large inner diameter. The spindle 10 drives the workpiece 86 through the medium of the clamping device 84, and the internal grinding wheel 87 on the right-hand socket 6 of FIG. 6 is in the process of removing material from the internal surface of the workpiece 86. It will be seen that, in the machine of FIG. 6, the grinding unit 11 can support material removing tools as well as workpieces. This feature greatly enhances the versatility of the grinding machine.

When the treatment of a series of workpieces 86 is completed, i.e., when the internal grinding wheel 87 is no longer needed for removal of material from workpieces, the control unit (not shown in FIG. 6) of the grinding machine is caused to move the grinding unit 11 upwardly, as viewed in FIG. 6, to such an extent that the axis of the spindle 10 coincides with the axis of the free (unoccupied) receiving means 88 of the second or auxiliary magazine 82. In the next step, the grinding unit 11 is moved in a direction to the right, i.e., longitudinally of the guide rails 77, so that it can deliver the work clamping device 84 into the range of the receiving means 88 on the magazine 82. The work clamping device 84 is then secured to the receiving means 88 before the magazine 82 is indexed about the vertical axis 83 in order to move another tool close to the grinding unit 11 so that such tool can be attached to the spindle 10. For example, the magazine 82 can be indexed through 180° so that the grinding wheel 13a can be secured to the spindle 10 before the grinding unit 11 is shifted to a position in which the grinding wheel 13a can remove material from a workpiece which is held by one of the sockets 6. More specifically, such workpiece is held by a holder which is coupled to the selected socket 6.

If the working surface of the internal grinding wheel 87 which is supported by the right-hand socket 6 of FIG. 6 requires dressing, the grinding unit 11 is indexed through 180° about the axis 12 so that the dressing tool 81 is in proper position for treatment of the grinding wheel 87.

Figure 7:
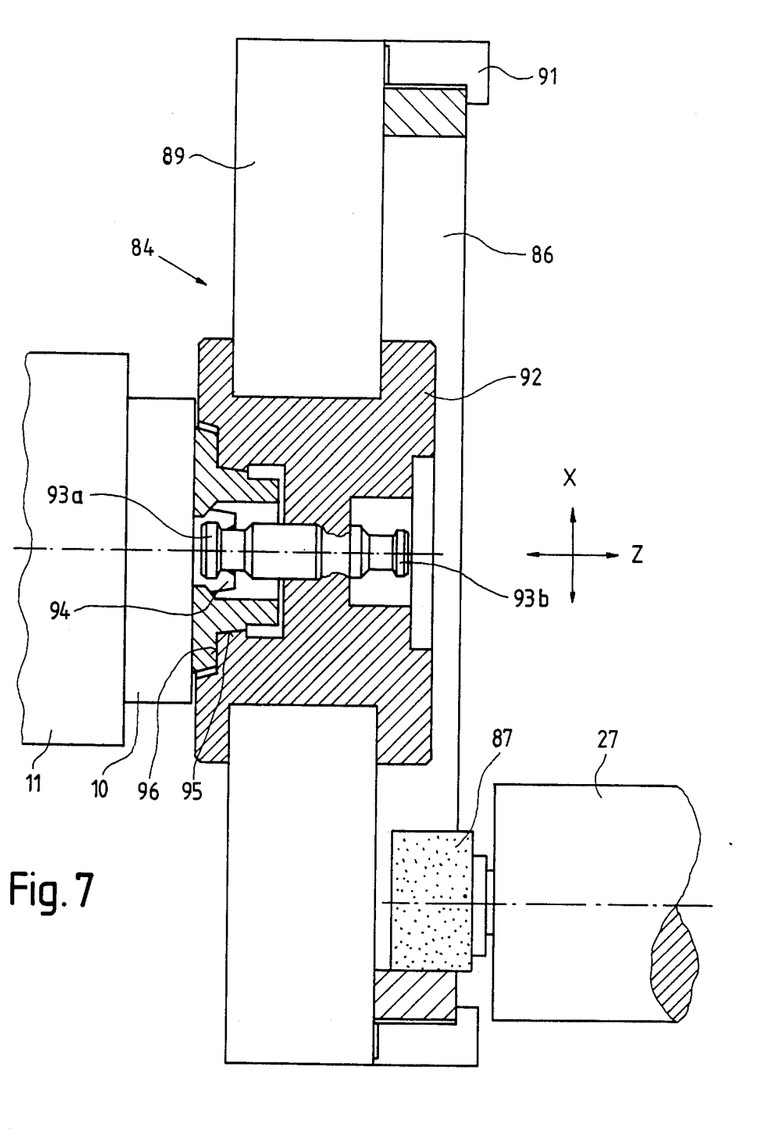
FIG. 7 is an enlarged sectional view of a detail in the grinding machine of FIG. 6.

The construction of the means for releasably coupling the spindle 10 of the grinding unit 11 with a work clamping device 84 is shown in FIG. 7. The work clamping device 84 comprises a disc 89 which is provided with an annulus of jaws 91 disposed at its periphery and serving to releasably hold a workpiece 86. As mentioned above, the workpiece 86 can constitute a ring having external teeth and a larger inner diameter. The internal grinding wheel 87 is supposed to treat the internal surface of the workpiece 86. The disc 89 has a centrally located hub 92 with retaining heads 93a and 93b. The spindle 10 is rotatably mounted in the grinding unit 11 and has an axial passage for a pull rod having claws 94 which can engage the head 93a of the hub 92 in order to securely clamp the disc 89 to the grinding unit 11 in such a way that the disc 89 receives torque from the spindle 10. The means for centering the disc 89 on the spindle 10 comprises complementary conical surfaces 95 and radially extending surfaces 96 on the spindle 10 and hub 92.

At least one receiving means 88 of the magazine 82 has an axially reciprocable pull rod with claws analogous to the claws 94 shown in FIG. 7 and operable to engage the right-hand head 93b of the hub 92 when the clamping device 84 is to be transferred from the spindle 10 into the one receiving means 88.

FIG. 7 shows that the internal grinding wheel 87 of the holder 7 including the part 27 shown in the lower right-hand portion of FIG. 7 can readily treat the internal surface of a large-diameter workpiece 86 on the disc 89. The dimensions of the workpiece 86 which is shown in FIG. 7 greatly exceed the dimensions of workpieces which can be properly secured to a holder 7. Thus, the versatility of the grinding machine of FIG. 6 is enhanced considerably by the novel expedient of utilizing the grinding unit 11 as a means for supporting grinding tools (such as 13a) or work clamping devices (such as 84).

The work clamping device 84 constitutes but one type of means for holding a workpiece so that the workpiece can be rotated by the spindle 10 of the grinding unit 11. For example, the work clamping device 84 of FIG. 7 can be replaced with a magnetic work clamping device of any known design. If the magnetic clamping device requires connection to a source of electrical energy, the means for supplying electrical energy from an outside source can be constructed in the same way as described with reference to the conductor 44 shown in FIG. 2A. For example, one or more electrical conductors can be placed adjacent to the radial centering surfaces 96 which are shown in FIG. 7. Furthermore, it is possible to utilize slip rings and other current-conducting means of conventional design. All that counts is to ensure that, if the work clamping device on the spindle 10 of the grinding unit 11 consumes energy or carries parts which consume energy, the grinding unit 11 is equipped with means for connecting the work clamping device with a source of elecrical energy, with a source of pressurized hydraulic or pneumatic fluid, or with means for evacuating fluid from ports or channels of the selected clamping device.

The grinding machine which embodies the features of FIGS. 6 and 7 is even more versatile than the machine of FIG. 1. This machine can employ several sockets 6 and, in addition, the grinding unit 11 can be used as a manipulator and also as a means for supporting workpieces, especially workpieces which cannot be readily mounted on a socket 6. As explained in connection with FIGS. 6 and 7, the workpieces which are preferably mounted or which must be mounted on the grinding unit 11 include relatively large workpieces, especially those which must be treated by an internal grinding wheel, such as the grinding wheel 87.

The provision of a control unit which can cause the manipulator (grinding unit 11) to perform the functions which involve the transport of holders 7 in a manner as described with reference to FIG. 1 and/or the functions which involve the transfer of tools (such as 13a) and work clamping devices (such as 84) between the unit 11 and the magazine 82 contributes to universality (i.e., practically unlimited versatility) of the machine as well as to a higher output because the transfer of work holders, tool holders and/or tools can be carried out in a highly predictable manner irrespective of the skill and-/or conscientiousness of the attendant or attendants. Such predictable transport of work holders, tool holders and tools renders it possible to ensure economical treatment of short, medium long or very long series of products whose dimensions and/or finish match or very closely approximate the desired dimensions and/or finish with minimal or negligible tolerances.

The versatility of the improved grinding machine is enhanced still further by equipping it with a wide variety of holders which can support rotary parts, steady rests, tailstocks, dressing tools and/or dressing apparatus, internal grinding wheels and/or many others.

The feature that the grinding unit 11 can support workpieces in lieu of a socket 6, i.e., that the part which normally supports a material removing tool can be used as a means for supporting a workpiece, whereas the part (such as a socket 6) which normally serves to support or to constitute a work holder carries a tool, renders it possible to employ the improved machine for the treatment of workpieces which normally require the utilization of a special single-purpose grinding machine. In the machine of FIGS. 6 and 7, oddly shaped and/or dimensioned workpieces can be treated in routine fashion in lieu of workpieces which can be carried by one of the sockets 6. The provision of a discrete second or auxiliary magazine 82 for tools (such as 13a) and work clamping devices (such as 84) contributes still further to versatility of the improved grinding machine and renders it possible to maintain a large number of spare work holders, tool holders and/or tools in immediate or close proximity of the material removing station or stations.

FIG. 1 shows that the magazine 17 comprises a single turret 17a which is indexible about the vertical axis 19. If the capacity of the magazine 17 is to be increased, such magazine can be provided with two or more turrets 17a which are disposed at different levels (one above the other) and each of which can have a reasonable number of receiving means 21 for temporary storage of holders 7 or the like. The magazine 17 is then equipped with a suitable elevator which can move a selected turret 17a to the level of the grinding unit 11 for convenient transfer of holders between the receiving means 21 of the selected turret and the unit 11. For example, one of two or more turrets 17a can be designed to temporarily store a supply of grinding wheels, and one or more turrets 17a can be provided with receiving means for different types of holders 7 each of which is connectable to the socket 6 on the table 3.

FIG. 1 further shows that the facets 26a, 26b and 26c are located in the deepmost portions of the respective receiving means 21 and are substantially or exactly vertical so as to come into abutment with the vertical facet 26 of a holder 7 which requires transfer into the magazine 17. However it is equally possible to replace the vertical facets 26a, 26b and 26c with horizontal facets and to provide the facets 26 at the undersides of the holders 7 so that the facet 26 of a holder which requires transfer into the magazine 17 can come to rest on top of the facet in the selected receiving means 21. The means for coupling the holders 7 to the selected receiving means 21 can be constructed in the same way as shown in FIGS. 2A and 2B. Thus, each of the receiving means 21 can carry coupling means 31, and the facets 26 of the holders 7 can be provided with recesses 39 for reception of claws 34 of the respective coupling means 31.

Each embodiment of the improved grinding machine renders it possible to change the setup within a fraction of the time which is required in presently known grinding machines. Moreover, the versatility of each of the improved grinding machines is incomparably higher than that of heretofore known grinding and like machines. Still further, the setup can be changed automatically and cannot be affected by the skill and/or lack of skill of the attendants. As mentioned above, shortening of the intervals which are needed to change the setup is particularly important when the machine must treat relatively short or medium long series or lots of workpieces, i.e., when the changes of setup must be carried out at rather frequent intervals. An additional important advantage of the improved grinding machine is its simplicity, especially in view of the pronounced versatility, not only as regards the possibility to use a wide variety of tools but also as concerns the variety of workpieces which can be subjected to treatment by external and/or internal grinding wheels.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A grinding machine, particularly a plain grinding machine, comprising a bed; at least one rotary tool spindle movably mounted on said bed; a carriage movably mounted on said bed, said carriage comprising at least one socket for holders, said spindle and said carriage being movable relative to each other in a plurality of mutually inclined directions; a magazine having a plurality of receiving means for holders; a plurality of holders in said magazine; a grinding unit rotatably supporting said spindle, movably mounted on said bed and including manipulator means for transferring selected holders between said magazine and said carriage, said manipulator means including means for transferring holders between selected receiving means of said magazine and said socket; said manipulator means, said socket and each of said receiving means having means for releasably coupling a selected holder to said manipulator means, to said socket or to one of said receiving means, each of said holders having a first coupling unit for attachment of such holder to the coupling means of said manipulator means and at least one second coupling unit for attachment to the coupling means of a selected receiving means or to the coupling means of said socket.

2. The machine of claim 1, further comprising a slide movably mounted on said bed, said grinding unit being mounted on and being movable with said slide.

3. The machine of claim 2, further comprising means for indexing said grinding unit with reference to said slide.

4. The machine of claim 3, wherein said slide is reciprocable along said bed in a predetermined direction and said unit is indexible about an axis which is normal to said predetermined direction.

5. The machine of claim 1, wherein said carriage further comprises a table and said socket is detachably affixed to said table, each of said holders comprising a different carrier for workpieces.

6. The machine of claim 1, wherein said socket has a facet, each of said receiving means has a facet, and each of said holders has a first and a second facet, the first facet of a selected holder abutting the facet of said socket when such selected work holder is coupled to said socket and the second facet of a selected holder abutting the facet of a receiving means when the selected holder is stored in said magazine.

7. The machine of claim 6, wherein said coupling means are provided in the regions of the facets of said socket and said receiving means, said first and second coupling units being respectively adjacent to the first and second facets of the corresponding holders.

8. The machine of claim 1, wherein said carriage comprises a single socket which can be separably coupled to any one of said holders.

9. The machine of claim 1, wherein said manipulator means includes means for moving a selected holder in first and second directions substantially at right angles to each other for the purpose of coupling the selected holder to or of uncoupling such selected holder from said socket.

10. The machine of claim 9, wherein said carriage comprises a table which is movable with reference to said bed and is disposed in a predetermined plane, said moving means being arranged to move selected holders in a plane which is parallel to said predetermined plane.

11. The machine of claim 9, wherein said socket comprises a facet abutting the holder which is coupled thereto, a surface which is normal to said facet, and a first clutch element in the region of said surface, at least one of said holders having a second clutch element which is complementary to and engages said first clutch element in response to coupling of said one holder to said socket.

12. The machine of claim 1, further comprising control means for initiating and terminating the movements of said unit, said spindle and said carriage, said control means including means for operating said manipulator means for the purpose of transferring holders between said socket and the receiving means of said magazine.

13. The machine of claim 1, wherein at least one of said holders includes a tailstock.

14. The machine of claim 1, wherein at least one of said holders comprises a steady rest for workpieces.

15. The machine of claim 1, wherein at least one of said holders comprises a work spindle.

16. The machine of claim 1, wherein at least one of said holders includes a dressing tool.

17. The machine of claim 1, wherein at least one of said holders comprises a tool spindle.

18. The machine of claim 1, wherein said socket has a first facet and at least one of said holders has a second facet which abuts the first facet when said one holder is transferred onto said socket, the coupling means of said socket including at least one clamping element provided on said socket outwardly adjacent said first facet and means for moving said coupling element relative to said socket toward and away from said first facet, the second coupling unit of said one holder comprising a shoe outwardly adjacent said second facet, said manipulator means comprising means for moving said shoe into and from engagement with said clamping element.

19. The machine of claim 1, wherein said magazine comprises at least one turret having a plurality of receiving means for holders, and means for indexing said turret about a predetermind axis so as to locate selected receiving means in a predetermined position with reference to said manipulator means.

20. The machine of claim 19, wherein said turret is indexible about a substantially vertical axis.

21. The machine of claim 19, wherein said turret comprises an annulus of receiving means disposed around said axis.

22. The machine of claim 1, further comprising means for connecting the holder on said socket to a source of electrical energy.

23. The machine of claim 1, further comprising a source of fluid and means for connecting such source with the holder on said socket.

24. The machine of claim 1, wherein at least one of said holders comprises a mobile component and further comprising a prime mover and means for transmitting motion from said prime mover to the mobile component of said one holder when such one holder is transferred onto said socket.

25. A grinding machine, particularly a plain grinding machine, comprising a bed; at least one rotary tool spindle movably mounted on said bed; a carriage movably mounted on said bed, said spindle and said carriage being movable relative to each other in a plurality of mutually inclined directions; a magazine; a plurality of holders in said magazine; manipulator means for transferring selected holders between said magazine and said carriage; and an additional holder for the spindle of an internal grinding wheel, said additional holder being transferrable between said manipulator means and at least one receiving means of said magazine and being mounted on said manipulator means while the internal grinding wheel on its spindle is in use to remove material from a workpiece on said carriage.

26. The machine of claim 25, wherein said manipulator means includes means for supplying electrical energy to said additional holder.

27. The machine of claim 25, wherein said manipulator means includes means for supplying a fluid to said additional holder while the additional holder is mounted on said manipulator means.

28. A grinding machine, particularly a plain grinding machine, comprising a bed; storing means; a grinding unit mounted on and movable relative to said bed; a carriage mounted on said bed; a grinding tool holder transferrable between said storing means and said carriage; at least one work holder transferrable between said storing means and said grinding unit, said work holder comprising a disc; and means for releasably coupling said disc to said grinding unit in lieu of a grinding tool.

29. The machine of claim 28, wherein said grinding unit comprises a rotary spindle and further comprising means for releasably coupling said work holder to said spindle.

30. A grinding machine, particularly a plain grinding machine, comprising a bed; storing means; a grinding unit mounted on and movable relative to said bed; a carriage mounted on said bed; a grinding tool holder transferrable between said storing means and said carriage; and at least one work holder transferrable between said storing means and said grinding unit, said storing means comprising several magazines including a first magazine for temperary storage of holders and a second magazine for temporary storage of additional holders.

31. A grinding machine, particularly a plain grinding machine, comprising a bed; at least one rotary tool spindle movably mounted on said bed; a carriage movably mounted on said bed, said carriage comprising at least one socket, said spindle and said carriage being movable relative to each other in a plurality of mutually inclined directions; a magazine having a plurality of receiving means for temporary storage of at least one element including at least one tailstock, steady rest, dressing unit, work spindle head and/or grinding wheel head; and a grinding unit rotatably supporting said spindle, movably mounted on said bed and including manipulator means for transferring selected ones of said stored elements between said magazine and said socket, said manipulator means, said socket and each of said receiving means having means for releasably coupling a selected one of said elements to said manipulator means, to said socket or to one of said receiving means, each of said elements having a first coupling unit for attachment of such element to the coupling means of said manipulator means and at least one second coupling unit for attachment to the coupling means of a selected receiving means or to the coupling means of said socket.

* * * * *